(12) United States Patent
Kim et al.

(10) Patent No.: US 12,110,938 B2
(45) Date of Patent: Oct. 8, 2024

(54) VIBRATION ISOLATION TABLE FOR SEMICONDUCTOR EQUIPMENT AND VIBRATION ISOLATION TABLE SYSTEM INCLUDING THE SAME

(71) Applicant: Samsung Electronics Co., Ltd., Suwon-si (KR)

(72) Inventors: Hyunchul Kim, Suwon-si (KR); Souk Kim, Seoul (KR); Younghoon Sohn, Seoul (KR)

(73) Assignee: Samsung Electronics Co., Ltd. (KR)

( * ) Notice: Subject to any disclaimer, the term of this patent is extended or adjusted under 35 U.S.C. 154(b) by 332 days.

(21) Appl. No.: 17/718,423

(22) Filed: Apr. 12, 2022

(65) Prior Publication Data

US 2023/0079008 A1 Mar. 16, 2023

(30) Foreign Application Priority Data

Sep. 14, 2021 (KR) .................. 10-2021-0122371

(51) Int. Cl.
*F16F 15/02* (2006.01)
(52) U.S. Cl.
CPC ................................ *F16F 15/02* (2013.01)
(58) Field of Classification Search
CPC ....... F16F 15/02; G03F 7/70833; G03F 7/709
See application file for complete search history.

(56) References Cited

U.S. PATENT DOCUMENTS

| 4,048,842 A * | 9/1977 | Baratoff ............. F16M 7/00 |
| | | 72/466.9 |
| 9,977,346 B2 * | 5/2018 | Okada ............. G03F 7/70725 |
| 2002/0155731 A1 | 10/2002 | Suenaga et al. |
| 2008/0174057 A1 | 7/2008 | Kim et al. |
| 2012/0069317 A1 * | 3/2012 | Peijster ............. G03F 7/70833 |
| | | 355/72 |
| 2019/0331195 A1 | 10/2019 | Lee et al. |
| 2023/0094685 A1 * | 3/2023 | Nishino ............. G03F 7/20 |
| | | 355/72 |

FOREIGN PATENT DOCUMENTS

| KR | 20020075293 A | 10/2002 |
| KR | 20060116487 A | 11/2006 |
| KR | 100791079 B1 | 1/2008 |
| KR | 20190124842 A | 11/2019 |
| KR | 102120440 B1 | 6/2020 |
| KR | 102176141 B1 | 11/2020 |
| KR | 102249154 B1 | 5/2021 |

* cited by examiner

*Primary Examiner* — Bradley Duckworth
(74) *Attorney, Agent, or Firm* — Myers Bigel, P.A.

(57) ABSTRACT

A vibration isolation table of the disclosure may include a lower structure including a plurality of block structures, a middle structure on the lower structure, and an upper structure on the middle structure. The plurality of block structures may be spaced apart from one another such that a space is formed between adjacent ones of the plurality of block structures. At least one of the lower structure and the upper structure may include high attenuation concrete.

19 Claims, 13 Drawing Sheets

VIBRATION ISOLATION TABLE FOR SEMICONDUCTOR EQUIPMENT AND VIBRATION ISOLATION TABLE SYSTEM INCLUDING THE SAME

CROSS-REFERENCE TO THE RELATED APPLICATION

This application claims priority from Korean Patent Application No. 10-2021-0122371, filed on Sep. 14, 2021, in the Korean Intellectual Property Office, the disclosure of which is incorporated herein by reference in its entirety.

FIELD

The example embodiments of the disclosure relate to a vibration isolation table on which semiconductor equipment is disposed, and a vibration isolation table system including the vibration isolation table.

BACKGROUND

On a semiconductor manufacturing line for manufacture of a semiconductor device, a plurality of pieces of semiconductor equipment for performing a photo process, an etching process, a thin film deposition process, etc. may be used. Most of such pieces of semiconductor equipment perform very precise processes and, as such, may be very susceptible to vibration, etc. transferred from the exterior. To this end, most pieces of semiconductor equipment are installed on a vibration isolation table capable of absorbing or alleviating a certain portion of external vibration, upon being installed on a semiconductor manufacturing line, without being directly installed on a bottom surface of the semiconductor manufacturing line.

SUMMARY

The example embodiments of the disclosure provide a vibration isolation table and a vibration isolation table system which are capable of maintaining a vibration attenuation effect at a predetermined level while securing a space capable of enabling an interfering object to be disposed on a lattice beam.

A vibration isolation table according to an example embodiment of the disclosure may include a lower structure including a plurality of block structures, a middle structure on the lower structure, and an upper structure on the middle structure. The plurality of block structures may be spaced apart from one another such that a space is formed between adjacent ones of the plurality of block structures. At least one of the lower structure and the upper structure may include high attenuation concrete.

A vibration isolation table system according to an example embodiment of the disclosure may include an independent foundation structure including a floor support and a lattice beam, a vibration isolation table on the independent foundation structure, and a support structure disposed around the vibration isolation table on the independent foundation structure. The vibration isolation table may include a lower structure including a plurality of block structures, an H-beam on the lower structure, and an upper structure on the H-beam. The plurality of block structures may be spaced apart from one another such that a space is formed between adjacent ones of the plurality of block structures. At least one of the lower structure and the upper structure may include high attenuation concrete including a polymer and concrete.

A vibration isolation table according to an example embodiment of the disclosure may include a lower structure including a first block, a second block and a third block, each of which is elongated in a first direction and has a bar shape, the first to third blocks being spaced apart from one another in a second direction perpendicular to the first direction such that a space is formed between adjacent ones of the first to third blocks, an H-beam on the lower structure, the H-beam vertically overlapping the first to third blocks while being elongated in the second direction, and an upper structure on the H-beam, the upper structure vertically overlapping at least a portion of each of the first to third blocks and at least a portion of the H-beam and having a parallelepiped shape. At least one of the lower structure and the upper structure may include high attenuation concrete.

DETAILED DESCRIPTION

Figure 1:
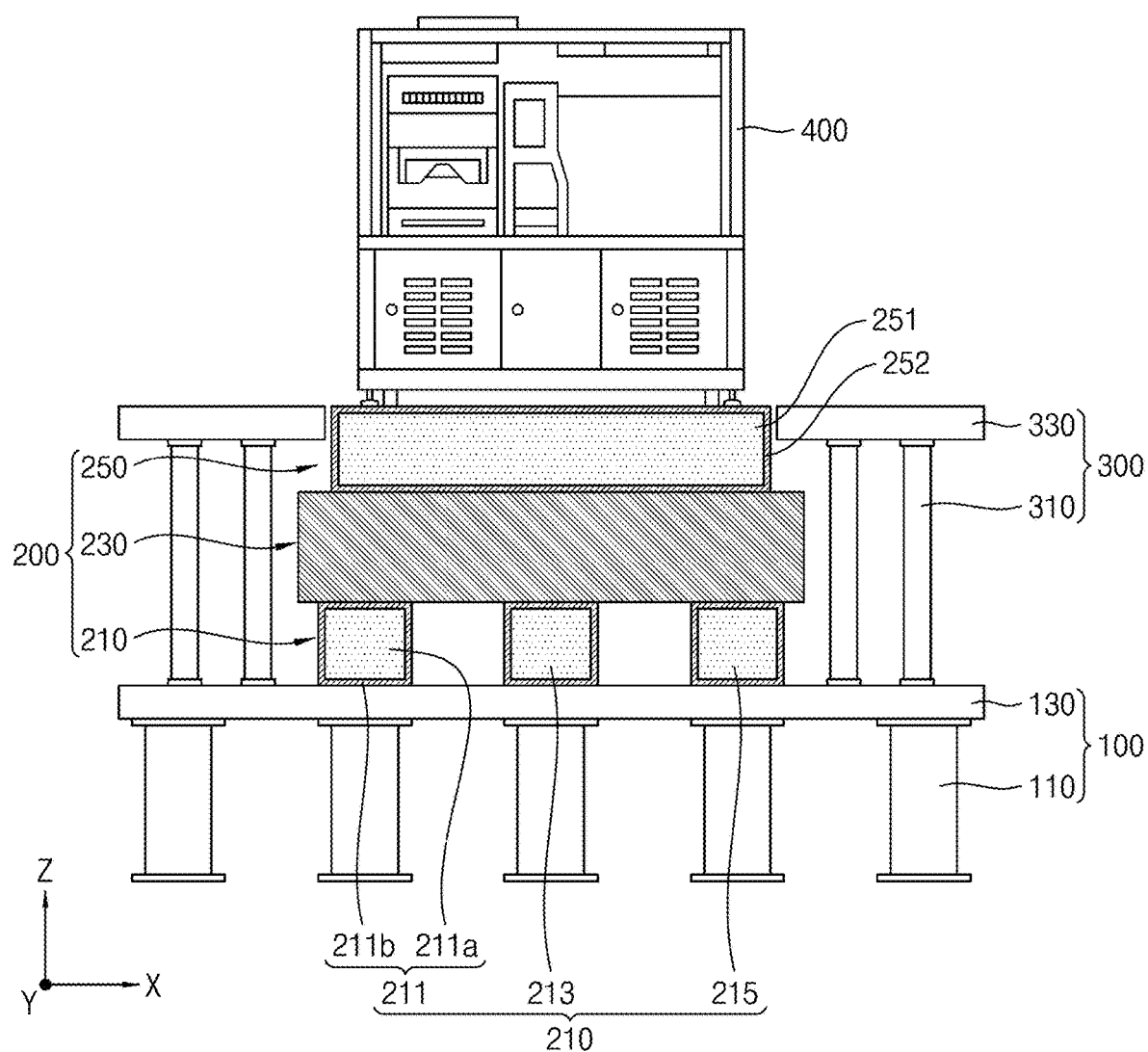
FIG. 1 is a cross-sectional view showing a vibration isolation table system for semiconductor equipment according to an example embodiment of the disclosure.
Figure 2:
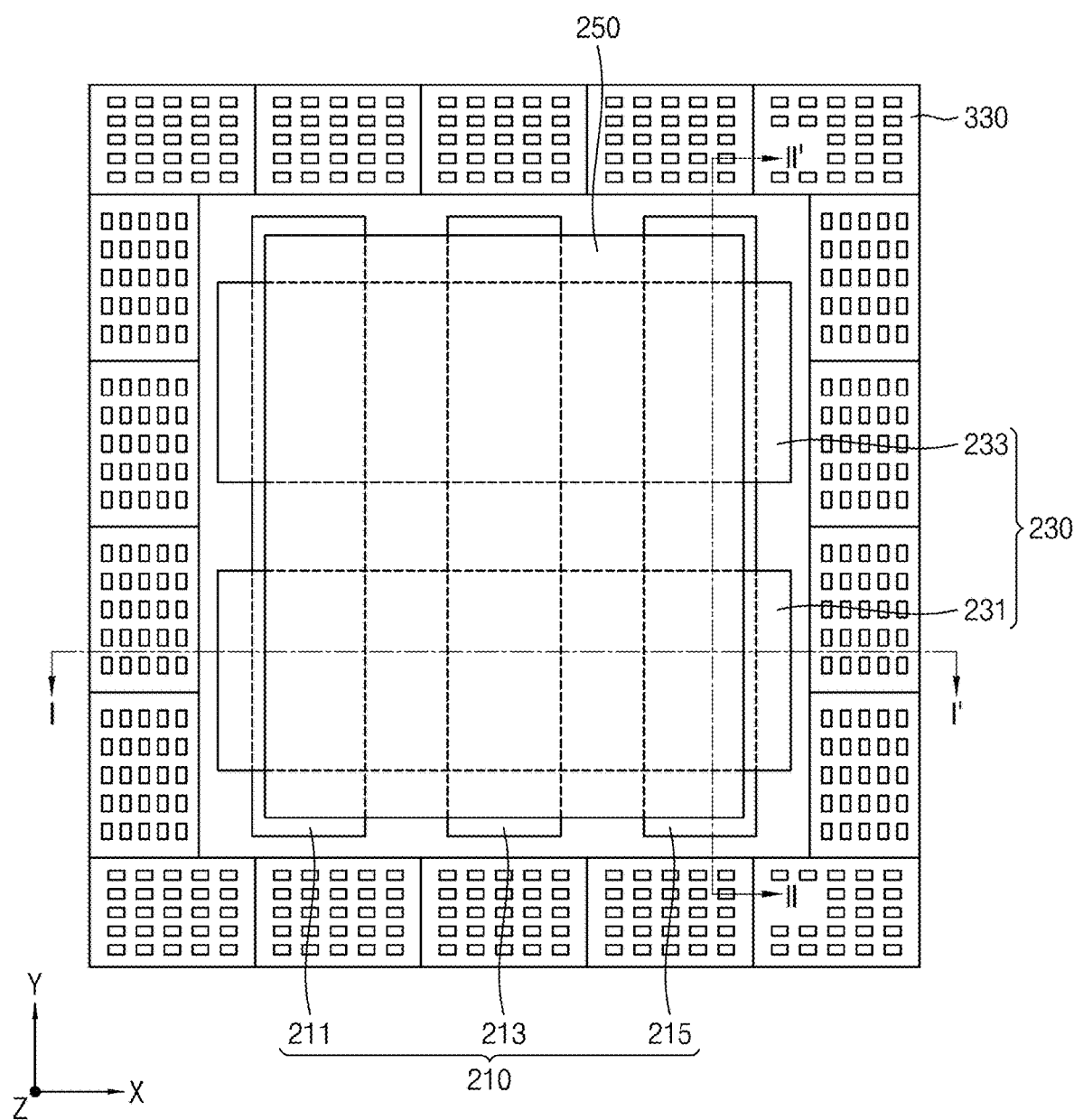
FIG. 2 is a plan view of the vibration isolation table system of FIG. 1.
Figure 3:
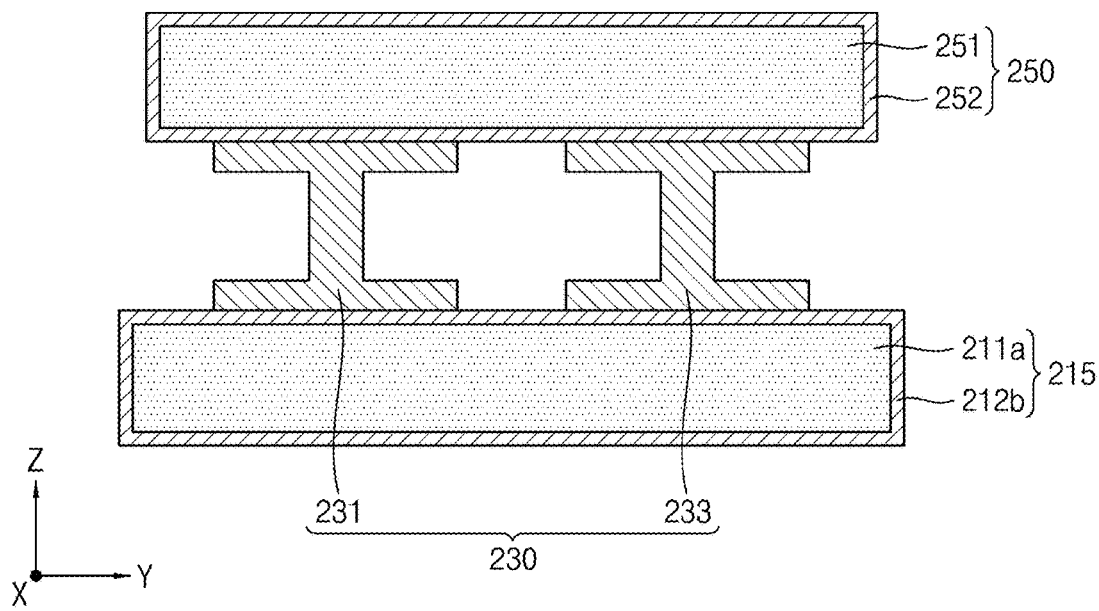
FIG. 3 is a cross-sectional view taken along line II-II' of FIG. 2.
Figure 4:
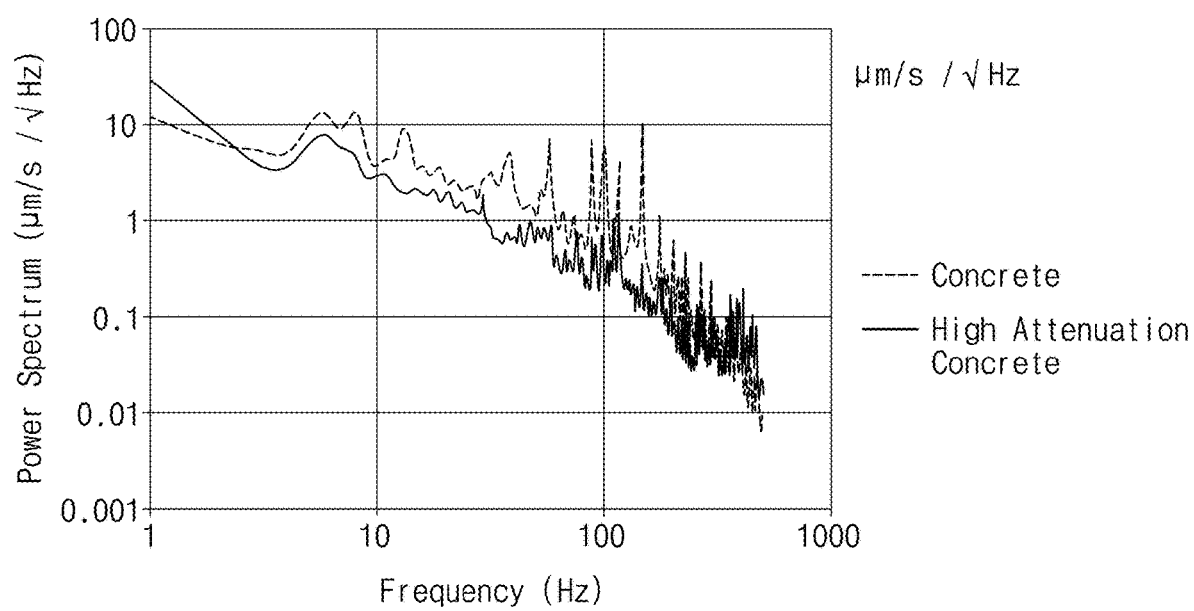
FIG. 4 is a graph depicting power spectral densities (PSD) of general concrete and high attenuation concrete.

FIG. 1 is a cross-sectional view showing a vibration isolation table system for semiconductor equipment according to an example embodiment of the disclosure. FIG. 2 is a plan view of the vibration isolation table system of FIG. 1. A cross-sectional view taken along line I-I' of FIG. 2 corresponds to the figure of the vibration isolation table system of FIG. 1. FIG. 3 is a cross-sectional view taken along line II-IF of FIG. 2. FIG. 4 is a graph depicting power spectral densities (PSD) of general concrete and high attenuation concrete.

Referring to FIGS. 1 to 3, the vibration isolation table system may include an independent foundation structure 100, a vibration isolation table 200, and a support structure 300. The vibration isolation table 200 and the support structure 300 may be disposed on the independent foundation structure 100. Semiconductor equipment 400 may be disposed on the vibration isolation table 200.

The independent foundation structure 100 may include a floor support 110 and a lattice beam 130. The lattice beam 130 may be disposed on the floor support 110. The floor support 110 may be disposed on a floor and, as such, may support the lattice beam 130. The lattice beam 130 may be supported by the floor support 110 such that the lattice beam 130 is spaced apart from the floor. The lattice beam 130 may be formed by a plurality of horizontally-extending beams interconnected while being arranged in the form of a lattice. For example, the lattice beam 130 may include beams extending in a first direction (an X direction) and beams extending in a second direction (a Y direction).

The vibration isolation table 200 may be disposed on the lattice beam 130. The vibration isolation table 200 may include a lower structure 210, a middle structure 230, and an upper structure 250. The lower structure 210 may be directly disposed on the lattice beam 130, the middle structure 230 may be directly disposed on the lower structure 210, and the upper structure 250 may be directly disposed on the middle structure 230. The middle structure 230 may be disposed between the lower structure 210 and the upper structure 250. At least one of the lower structure 210 and the upper structure 250 may include high attenuation concrete.

The lower structure 210 may include a plurality of block structures or blocks 211, 213 and 215. The terms "block structure" and "block" may be used interchangeably herein. The block structures 211, 213 and 215 may be horizontally spaced apart from one another. As the block structures 211, 213 and 215 are spaced apart from one another, a predetermined space may be formed among the block structures 211, 213 and 215. In an embodiment, the lower structure 210 may include a first block structure 211, a second block structure 213, and a third block structure 215. The first block structure 211, the second block structure 213, and the third block structure 215 may be spaced apart from one another in the first direction (the X direction). The second block structure 213 may be disposed between the first block structure 211 and the third block structure 215. The first block structure 211, the second block structure 213, and the third block structure 215 may extend in the second direction (the Y direction) perpendicular to the first direction (the X direction). The first direction (the X direction) and the second direction (the Y direction) may be perpendicular to each other in one plane, and the plane may be parallel to a floor surface. Each of the first block structure 211, the second block structure 213 and the third block structure 215 may have a rectangular parallelepiped bar shape, and the cross-section of each of the first block structure 211, the second block structure 213 and the third block structure 215 may be a rectangle. For example, all cross-sections of each of the first block structure 211, the second block structure 213 and the third block structure 215 viewed in the first direction (the X direction), the second direction (the Y direction) and a third direction (a Z direction) may be a rectangle. In an embodiment, the first block structure 211, the second block structure 213 and the third block structure 215 may each have the same structure and the same shape.

Each of the first block structure 211, the second block structure 213 and the third block structure 215 may include an inner filling portion or inner fill portion 211a and an outer frame portion 211b. The outer frame portion 211b may have a rectangular parallelepiped bar shape, and be empty in an interior thereof. The inner filling portion 211a may be disposed in the interior of the outer frame portion 211b. The inner filling portion 211a may fill the interior of the outer frame portion 211b. The inner filling portion 211a may completely fill the interior of the outer frame portion 211b, and an outer side surface of the inner filling portion 211a may contact an inner side surface of the outer frame portion 211b. The inner filling portion 211a may have a rectangular parallelepiped bar shape, and the outer frame portion 211b may completely surround the inner filling portion 211a. The outer frame portion 211b may include an iron-based material. The outer frame portion 211b may function to prevent damage to the inner filling portion 211a. The inner filling portion 211a may include high attenuation concrete. The high attenuation concrete may include concrete and a polymer. Referring to FIG. 4, it can be seen that the high attenuation concrete exhibits a higher vibration attenuation effect than general concrete. The example embodiments of the disclosure may further enhance the vibration attenuation effect of the vibration isolation table by using the high attenuation concrete rather than the general concrete. In addition, the example embodiments of the disclosure may enhance the vibration attenuation effect and dynamic stiffness of the vibration isolation table by using the high attenuation concrete for an inner filling portion or inner fill portion 251 of the upper structure 250, as will be described below.

As the lower structure 210 includes the block structures 211, 213 and 215 spaced apart from one another, as described above, a space may be provided among the block structures 211, 213 and 215. Interfering objects, such as an electric cable, a LAN cable, piping, etc., disposed on the lattice beam 130 may be disposed in the space among the block structures 211, 213 and 215. As the block structures 211, 213 and 215 includes high attenuation concrete, the block structures 211, 213 and 215 may have a vibration attenuation effect while providing a space thereamong.

The middle structure 230 may be disposed on the first block structure 211, the second block structure 213 and the third block structure 215. Each of the first block structure 211, the second block structure 213 and the third block structure 215 may support the middle structure 230. The middle structure 230 may be an H-beam. The H-beam may include an iron-based material. The H-beam 230 may extend in the first direction (the X-direction) such that the H-beam 230 intersects the lower structure 210 in plan view. The H-beam 230 may intersect each of the first block structure 211, the second block structure 213 and the third block structure 215 in plan view.

The middle structure 230 may include a plurality of H-beams. In an embodiment, the middle structure 230 may include a first H-beam 231 and a second H-beam 233. Each of the first H-beam 231 and the second H-beam 233 may extend in the first direction (the X direction). The first H-beam 231 and the second H-beam 233 may be spaced apart from each other in the second direction (the Y direction). Although the middle structure 230 is shown in FIGS.

2 and 3 as including two H-beams, the example embodiments of the disclosure are not limited thereto. The middle structure 230 may be constituted by one H-beam or may be constituted by three or more H-beams.

The vibration isolation table 200 may adjust the height of the middle structure 230 and, as such, the overall height of the vibration isolation table 200 may be adjusted. The vibration isolation table 200 may have a reduced overall weight while securing a predetermined height through the middle structure 230, which is an H-beam, and, as such, the independent foundation structure 100 may withstand the load of the vibration isolation table 200.

The upper structure 250 may be disposed on the first H-beam 231 and the second H-beam 233. The upper structure 250 may have a plate shape. For example, the upper structure 250 may have the form of a slab which is a plate structure having greater horizontal and vertical lengths at each of top and bottom surfaces thereof than a height thereof. The upper structure 250 may vertically overlap or align with each of the first H-beam 231 and the second H-beam 233. The upper structure 250 may vertically overlap or align with each of the first block structure 211, the second block structure 213 and the third block structure 215. Dynamic stiffness of the vibration isolation table 200 may be secured through the upper structure 250.

The upper structure 250 may include the inner filling portion 251 and an outer frame portion 252. The outer frame portion 252 may have a rectangular parallelepiped bar shape, and may be empty in an interior thereof. The inner filling portion 251 may be disposed in the interior of the outer frame portion 252. The inner filling portion 251 may fill the interior of the outer frame portion 252. The inner filling portion 251 may completely fill the interior of the outer frame portion 252, and an outer side surface of the inner filling portion 251 may contact an inner side surface of the outer frame portion 252. The inner filling portion 251 may have a rectangular parallelepiped bar shape, and the outer frame portion 252 may completely surround the inner filling portion 251. The outer frame portion 252 may include an iron-based material. The inner filling portion 251 may include high attenuation concrete. The high attenuation concrete may include concrete and a polymer. The outer frame portion 252 may function to prevent damage to the inner filling portion 251.

In an embodiment, the outer frame portion 211b may be omitted from the lower structure 210 and, as such, the inner filling portion 211a may constitute the lower structure 210. For example, the outer frame portion 211b may be omitted from each of the first block structure 211, the second block structure 213 and the third block structure 215. In this case, each of the first block structure 211, the second block structure 213 and the third block structure 215 may be an inner filling portion 211a made of high attenuation concrete. In this case, the inner filling portion 211a, which is the lower structure 210, may be directly disposed on the lattice beam 130, and the middle structure 230 may be directly disposed on the inner filling portion 211a. That is, the inner filling portion 211a, which is the lower structure 210, may directly contact the lattice beam 130 and the middle structure 230.

In an embodiment, the outer frame portion 252 may be omitted from the upper structure 250 and, as such, the inner filling portion 251 may constitute the upper structure 250. In this case, the inner filling portion 251, which is the upper structure 250, may be directly disposed on the middle structure 230. That is, the inner filling portion 251, which is the upper structure 250, may directly contact the middle structure 230.

The support structure 300 may be disposed on the lattice beam 130. The support structure 300 may include a plurality of grating supports 310 and a grating 330. The grating supports 310 may support the grating 330 on the lattice beam 130. The grating supports 310 may be disposed around the vibration isolation table 200. The grating supports 310 may have a pillar shape. The grating 330 may be disposed on the grating supports 310. For example, the grating 330 may have a lattice shape. The grating 330 may be disposed around the vibration isolation table 200. In plan view, the grating 330 may surround the vibration isolation table 200. The grating 330 may be disposed around the upper structure 250 of the vibration isolation table 200. The grating 330 may be spaced apart from the upper structure 250. A top surface of the grating 330 may be disposed at the same vertical level as a top surface of the vibration isolation table 200 with reference to the floor surface. The grating 330 may horizontally overlap or align with the upper structure 250. The grating 330 may be disposed at a higher vertical level than the middle structure 230 with reference to the floor surface. For example, the support structure 300, which includes the grating supports 310 and the grating 330, may function as an auxiliary mechanism for transferring equipment to a position over the vibration isolation table 200.

The semiconductor equipment 400 may be disposed on the vibration isolation table 200. The semiconductor equipment 400 may be directly disposed on the upper structure 250 of the vibration isolation table 200. For example, the semiconductor equipment 400 disposed on the vibration isolation table 200 may be various pieces of semiconductor equipment such as exposure equipment, etching equipment, deposition equipment, analysis and measurement equipment, etc.

In an embodiment, only one of the lower structure 210 and the upper structure 250 may include high attenuation concrete, and the other of the lower structure 210 and the upper structure 250 may include general concrete and/or an iron structure made of an iron-based material. Of course, the other structure is not limited to the above-described condition.

Figure 5:
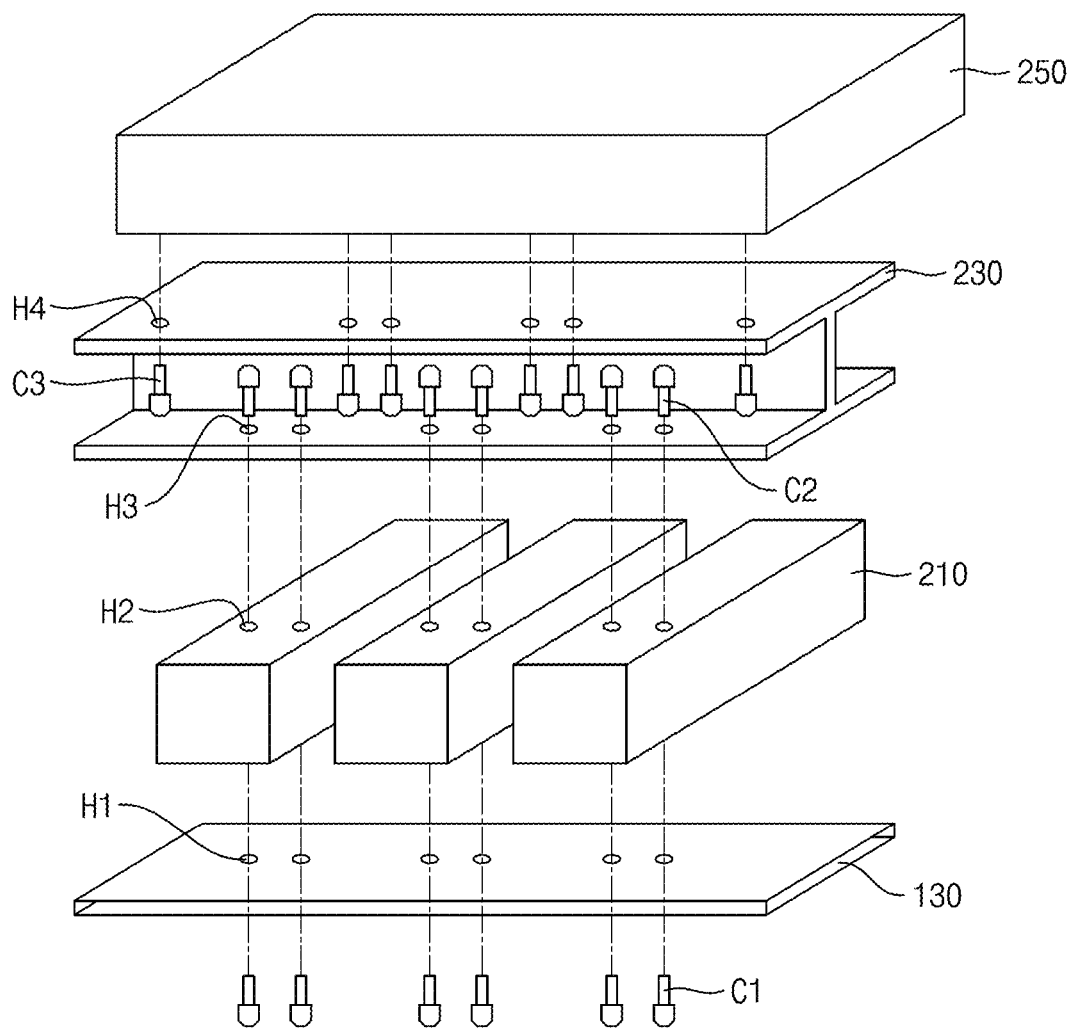
FIG. 5 is a schematic exploded perspective view of the vibration isolation table explaining a coupling method of the vibration isolation table according to an example embodiment of the disclosure.

FIG. 5 is an schematic exploded perspective view of the vibration isolation table explaining a coupling method of the vibration isolation table according to an example embodiment of the disclosure.

Referring to FIG. 5, the lattice beam 130 of the independent foundation structure 100, the lower structure 210, the middle structure 230 and the upper structure 250 may be intercoupled and fastened via fasteners C1, C2 and C3. For example, the fasteners C1, C2 and C3 may be anchor bolts. In an embodiment, the fasteners C1, C2 and C3 may include a first fastener C1, a second fastener C2, and a third fastener C3. The lower structure 210 may be fastened to the lattice beam 130 via the first fastener C1. A hole H1 may be formed at or in the lattice beam 130, and a hole may also be formed at or in a lower portion of the lower structure 210. The hole of the lower structure 210 may be formed to extend through the outer frame portion of the lower structure 210. The first fastener C1 may be inserted into the hole of the lower structure 210 while extending through the hole H1 of the lattice beam 130. The first fastener C1 may be inserted into and fastened to the inner filling portion of the lower structure 210 while extending through the hole of the lower structure 210.

The middle structure 230 may be fastened to the lower structure 210 via the second fastener C2. A hole H2 may be formed at or in an upper portion of the lower structure 210, and a hole H3 may also be formed at or in a lower portion of the middle structure 230. The hole H2 of the lower structure 210 may be formed to extend through the outer frame portion of the lower structure 210. The second fastener C2 may be inserted into the hole H2 of the lower structure 210 while extending through the hole H3 of the middle structure 230. The second fastener C2 may be inserted into and fastened to the inner filling portion of the lower structure 210 while extending through the hole H2 of the lower structure 210.

The upper structure 250 may be fastened to the middle structure 230 via the third fastener C3. A hole H4 may be formed at or in an upper portion of the middle structure 230, and a hole may also be formed at or in a lower portion of the upper structure 250. The hole of the upper structure 250 may be formed to extend through the outer frame portion of the upper structure 250. The third fastener C3 may be inserted into the hole of the upper structure 250 while extending through the hole H4 of the middle structure 230. The third fastener C3 may be inserted into and fastened to the inner filling portion of the upper structure 250 while extending through the hole of the upper structure 250.

Figure 6:
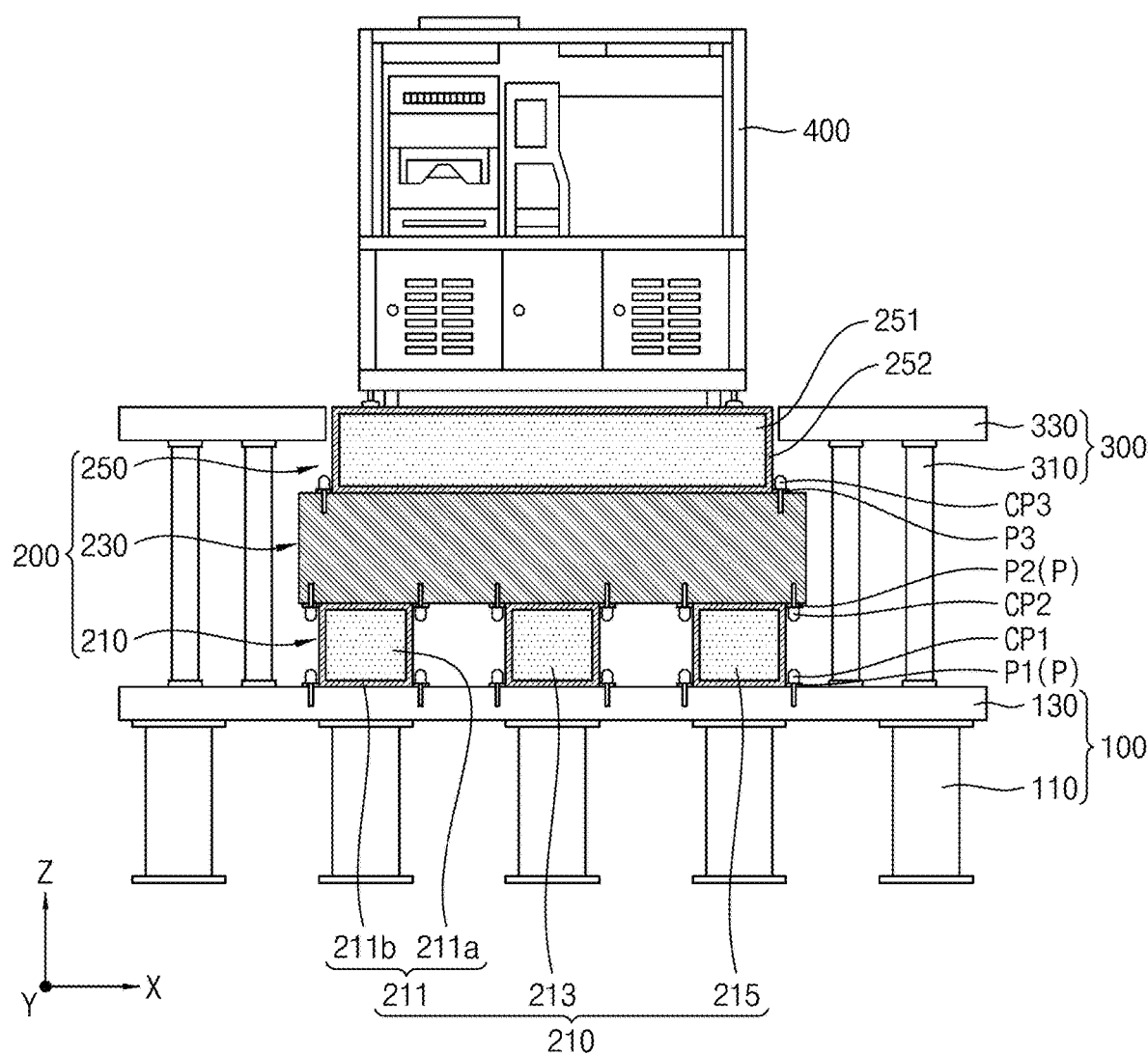
FIG. 6 is a cross-sectional view showing a vibration isolation table system for semiconductor equipment according to an example embodiment of the disclosure.
Figure 7:
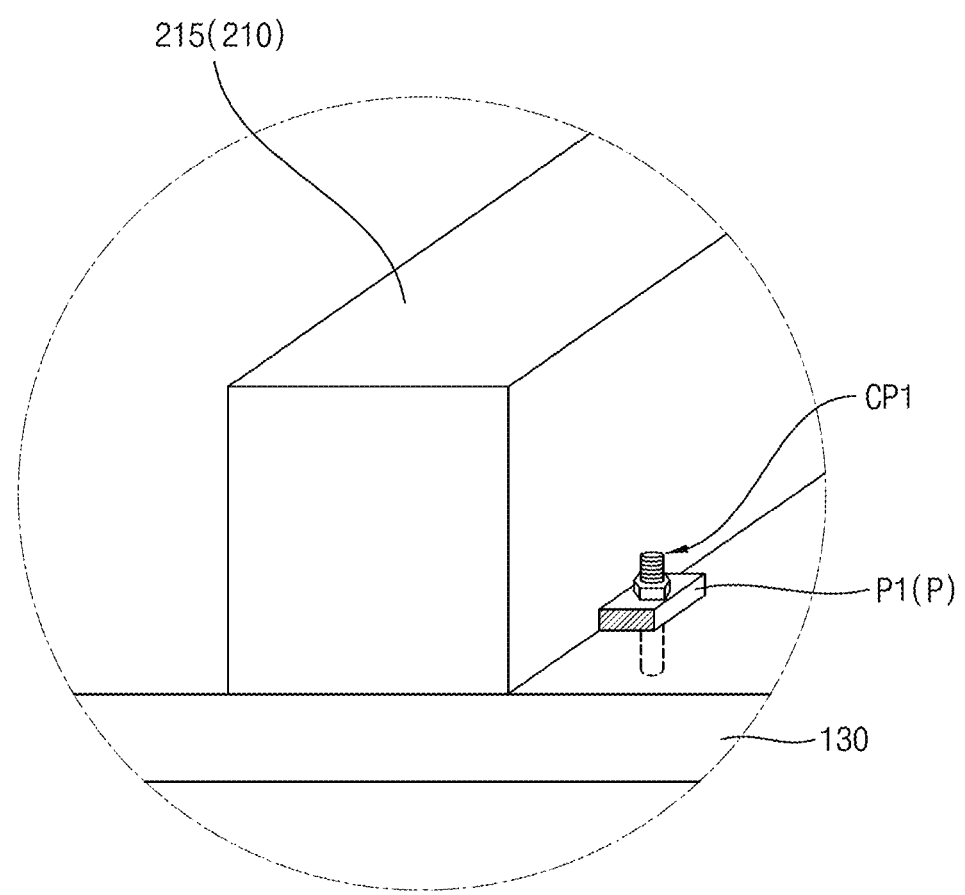
FIG. 7 is an enlarged perspective view showing a portion of a vibration isolation table included in the vibration isolation table system of FIG. 6.

FIG. 6 is a cross-sectional view showing a vibration isolation table system for semiconductor equipment according to an example embodiment of the disclosure. FIG. 7 is an enlarged perspective view showing a portion of a vibration isolation table included in the vibration isolation table system of FIG. 6.

Referring to FIGS. 6 and 7, a lower structure 210 may further include a plurality of protrusions P. The protrusions P may be formed to protrude from a side surface of the lower structure 210 in one direction. The protrusions P may be connected to an outer frame portion 211b of the lower structure 210. The protrusions P may be made of the same material as the outer frame portion 211b. For example, the protrusions P may have a quadrangular plate shape. A hole may be formed at or in each of the protrusions P such that the hole extends through the protrusion P in a vertical direction (a Z direction).

In an embodiment, the protrusions P may include a first protrusion P1 and a second protrusion P2. The first protrusion P1 may be disposed at a lower portion of the lower structure 210, and the second protrusion P2 may be disposed at an upper portion of the lower structure 210. A bottom surface of the first protrusion P1 may be coplanar with a bottom surface of the lower structure 210, and a top surface of the second protrusion P2 may be coplanar with a top surface of the lower structure 210. The first protrusion P1 may vertically overlap or align with a lattice beam 130. The lower structure 210 may be fastened to the lattice beam 130 via the first protrusion P1 and a first fastener CP1. The first fastener CP1 may be fastened to the lattice beam 130 while extending through the hole of the first protrusion P1. A middle structure 230 may be fastened to the lower structure 210 via the second protrusion P2 and a second fastener CP2. The second protrusion P2 may vertically overlap or align with the middle structure 230. Alternatively, the second fastener CP2 may be fastened to the second protrusion P2 while extending through a hole formed at or in the middle structure 230. For example, each of the first fastener CP1 and the second fastener CP2 may include a bolt and a nut.

In an embodiment, an upper structure 250 may further include a third protrusion P3. The third protrusion P3 may be disposed at a lower portion of the upper structure 250. A bottom surface of the third protrusion P3 may be coplanar with a bottom surface of the upper structure 250. The third protrusion P3 may vertically overlap or align with the middle structure 230. The upper structure 250 may be fastened to the middle structure 230 via the third protrusion P3 and a third fastener CP3. The third fastener CP3 may be fastened to the middle structure 230 while extending through a hole of the third protrusion P3. Alternatively, the third fastener CP3 may be fastened to the third protrusion P3 while extending through a hole formed at or in the middle structure 230. For example, the third fastener CP3 may include a bolt and a nut.

In an embodiment, at least one of the first protrusion P1, the second protrusion P2 and the third protrusion P3 may be omitted. For example, when only the first protrusion P1 is omitted, the lattice beam 130 and the lower structure 210 may be coupled via an anchor bolt, as described with reference to FIG. 5, the lower structure 210 and the middle structure 230 may be coupled via the second protrusion P2 and the second fastener CP2, and the middle structure 230 and the upper structure 250 may be coupled via the third protrusion P3 and the third fastener CP3. For example, when the second protrusion P2 and the third protrusion P3 are omitted, the lattice beam 130 and the lower structure 210 may be coupled via the first protrusion P1 and the first fastener CP1, the lower structure 210 and the middle structure 230 may be coupled via an anchor bolt, as described with reference to FIG. 5, and the middle structure 230 and the upper structure 250 may be coupled via an anchor bolt, as described with reference to FIG. 5.

In an embodiment, a vibration isolation table 200 may further include an adhesive material. The adhesive material may be, for example, epoxy. The adhesive material may be interposed in at least one of a region between the lattice beam 130 and the lower structure 210, a region between the lower structure 210 and the middle structure 230 and a region between the middle structure 230 and the upper structure 250. For example, when the adhesive material is interposed between the middle structure 230 and the upper structure 250, the adhesive material may contact both a top surface of the middle structure 230 and the bottom surface of the upper structure 250. In this case, the adhesive material may increase fixing force of the upper structure 250 to the middle structure 230.

Figure 8:
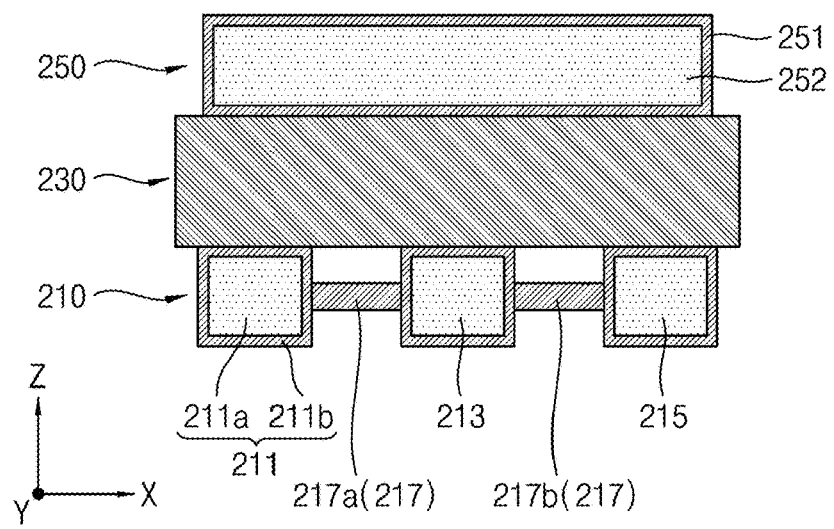
FIG. 8 is a cross-sectional view of a vibration isolation table according to an example embodiment of the disclosure.
Figure 9:
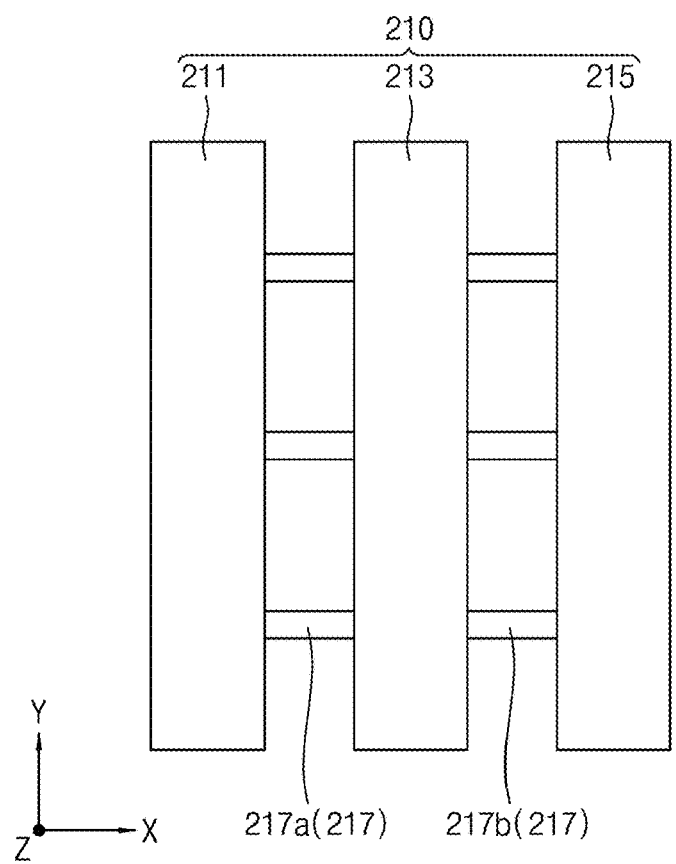
FIG. 9 is a plan view of a lower structure included in the vibration isolation table of FIG. 8.

FIG. 8 is a cross-sectional view of a vibration isolation table according to an example embodiment of the disclosure. FIG. 9 is a plan view of a lower structure included in the vibration isolation table of FIG. 8.

Referring to FIGS. 8 and 9, a lower structure 210 of a vibration isolation table 200 may further include a reinforcement 217. The reinforcement 217 may be disposed among block structures 211, 213 and 215 of the lower structure 210. The reinforcement 217 may interconnect the block structures 211, 213 and 215 of the lower structure 210. The reinforcement 217 may interconnect two most adjacent block structures 211, 213 and 215 from among the block structures 211, 213 and 215. In an embodiment, when the lower structure 210 includes a first block structure 211, a second block structure 213 and a third block structure 215 which are sequentially arranged in one direction, the reinforcement 217 may include a first reinforcement 217a interconnecting the first block structure 211 and the second block structure 213, and a second reinforcement 217b interconnecting the second block structure 213 and the third block structure 215. The first reinforcement 217a may be disposed between the first block structure 211 and the second block structure 213, and the second reinforcement 217b may be disposed between the second block structure 213 and the third block structure 215. The reinforcement 217 may be connected to an outer frame portion 211b of each of the block structures 211, 213 and 215. The reinforcement 217 may include the same material as the outer frame portion 211b. For example, the reinforcement 217 may include an iron-based material. As the block structures 211, 213 and 215 are interconnected via the reinforcement 217, a vibration attenuation effect of the lower structure 210 may be enhanced.

Figure 10:
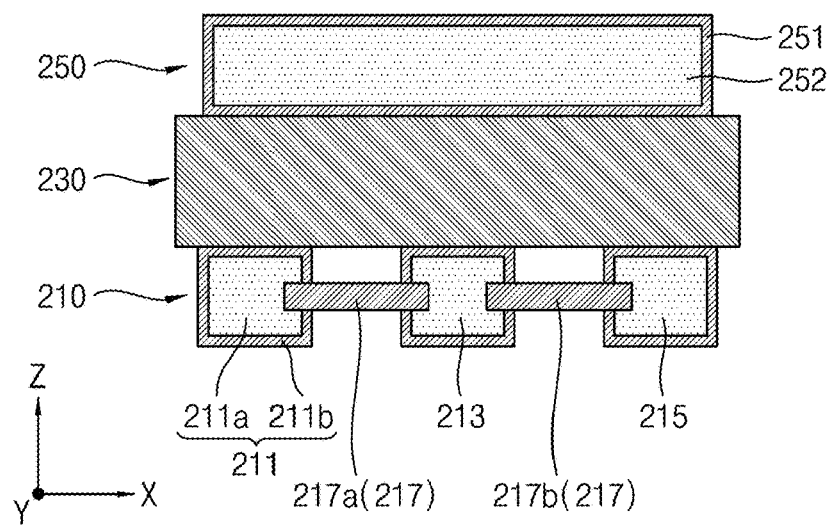
FIG. 10 is a cross-sectional view of a vibration isolation table according to an example embodiment of the disclosure.
Figure 11:
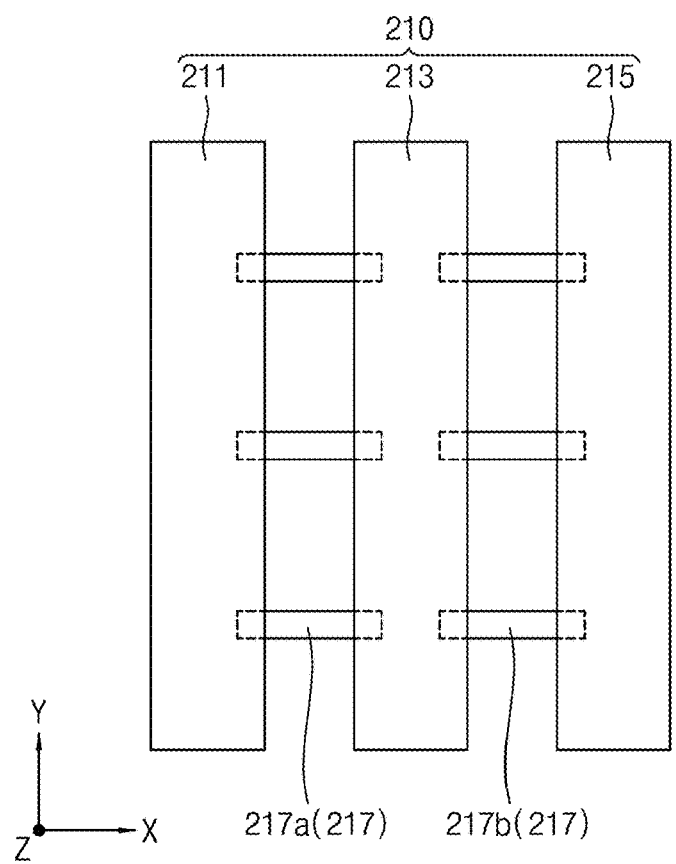
FIG. 11 is a plan view of a lower structure included in the vibration isolation table of FIG. 10.

FIG. 10 is a cross-sectional view of a vibration isolation table according to an example embodiment of the disclosure. FIG. 11 is a plan view of a lower structure included in the vibration isolation table of FIG. 10.

Referring to FIGS. 10 and 11, a reinforcement 217 included in a lower structure 210 may extend through outer frame portions 211b of block structures 211, 213 and 215, and a portion of the reinforcement 217 may be inserted into an inner filling portion 211a. As the reinforcement 217 is inserted into the inner filling portion 211a and, as such, is fixed by the inner filling portion 211a, fixing force and vibration attenuation effects of the block structures 211, 213 and 215 interconnected by the reinforcement 217 may be enhanced.

Figure 12:
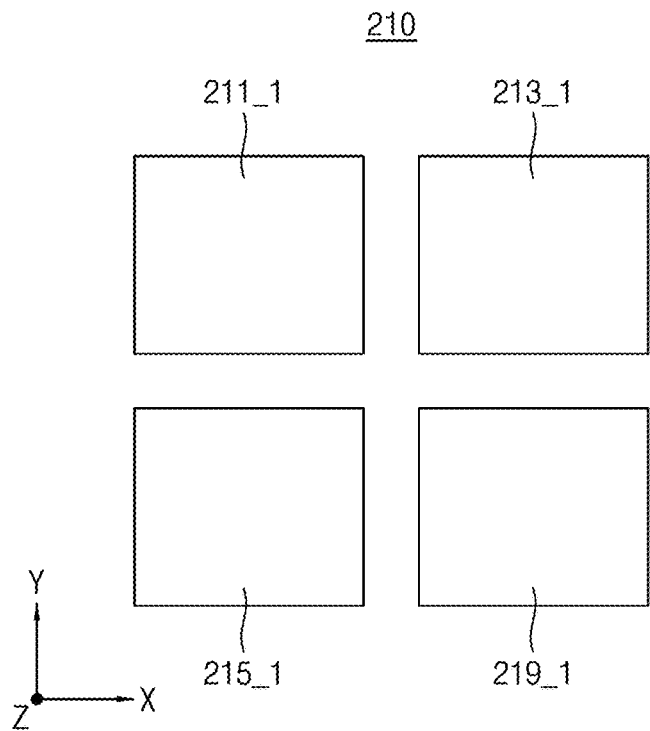
FIGS. 12 and 13 are plan views of lower structures each included in a vibration isolation table according to example embodiments of the disclosure, respectively.
Figure 13:
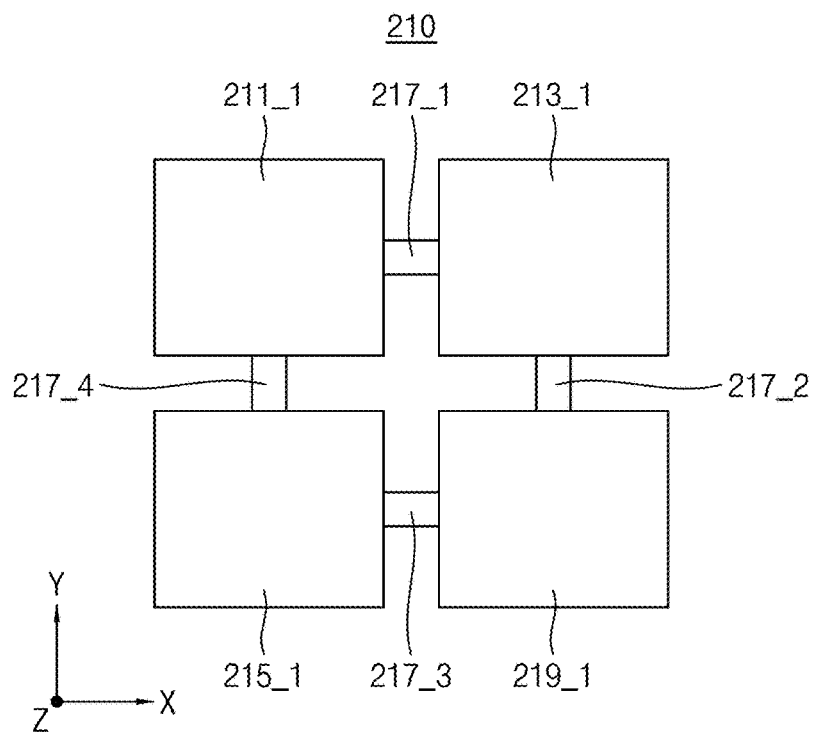

FIGS. 12 and 13 are plan views of lower structures each included in a vibration isolation table according to example embodiments of the disclosure, respectively.

Referring to FIG. 12, in an embodiment, a lower structure 210 may include a plurality of block structures 211_1, 213_1, 215_1 and 219_1 arranged in the form of a lattice. For example, all of the block structures 211_1, 213_1, 215_1 and 219_1 may have a rectangular parallelepiped bar shape. The block structures 211_1, 213_1, 215_1 and 219_1 may have the same size and the same shape. The block structures 211_1, 213_1, 215_1 and 219_1 may be disposed to be spaced apart from one another and, as such, a predetermined space may be formed among the block structures 211_1, 213_1, 215_1 and 219_1. The block structures 211_1, 213_1, 215_1 and 219_1 may be arranged in a first direction (an X direction), thereby forming a row, and may be arranged in a second direction (a Y direction), thereby forming a column. For example, the plurality of block structures 211_1, 213_1, 215_1 and 219_1 may include a first block structure 211_1, a second block structure 213_1, a third block structure 215_1, and a fourth block structure 219_1. The first block structure 211_1, the second block structure 213_1, the third block structure 215_1, and the fourth block structure 219_1 may have the same size and the same shape. Although not shown, each of the block structures 211_1, 213_1, 215_1 and 219_1 may include an inner filling portion and an outer frame portion. The first block structure 211_1 and the second block structure 213_1 may be aligned with each other in the first direction (the X direction). The third block structure 215_1 and the fourth block structure 219_1 may be aligned with each other in the first direction (the X direction). The first block structure 211_1 and the third block structure 215_1 may be aligned with each other in the second direction (the Y direction). The second block structure 213_1 and the fourth block structure 219_1 may be aligned with each other in the second direction (the Y direction). The lower structure 210 including the first to fourth block structures 211_1, 213_1, 215_1 and 219_1 may be disposed on the lattice beam 130 of FIG. 1, a middle structure 230 may be disposed on the lower structure 210, and an upper structure 250 may be disposed on the middle structure 230. The middle structure 230 and the upper structure 250 may overlap or align with the first to fourth block structures 211_1, 213_1, 215_1 and 219_1 in a vertical direction (a Z direction).

Referring to FIG. 13, a lower structure 210 may further include a plurality of reinforcements 217_1, 217_2, 217_3 and 217_4, as compared to the lower structure 210 of FIG. 12. The reinforcements 217_1, 217_2, 217_3 and 217_4 may include a first reinforcement 217_1 interconnecting the first block structure 211_1 and the second block structure 213_1, a second reinforcement 217_2 interconnecting the second block structure 213_1 and the fourth block structure 219_1, a third reinforcement 217_3 interconnecting the third block structure 215_1 and the fourth block structure 219_1, and a fourth reinforcement 217_4 interconnecting the third block structure 215_1 and the first block structure 211_1. In an embodiment, one or two of the first reinforcement 217_1, the second reinforcement 217_2, the third reinforcement 217_3 and the fourth reinforcement 217_4 may be omitted.

Although four block structures are shown in FIGS. 12 and 13 as being arranged to have two rows and two columns, the example embodiments of the disclosure are not limited thereto. For example, nine block structures may be arranged to have three rows and three columns, or sixteen block structures may be arranged to have four rows and four columns.

Figure 14:
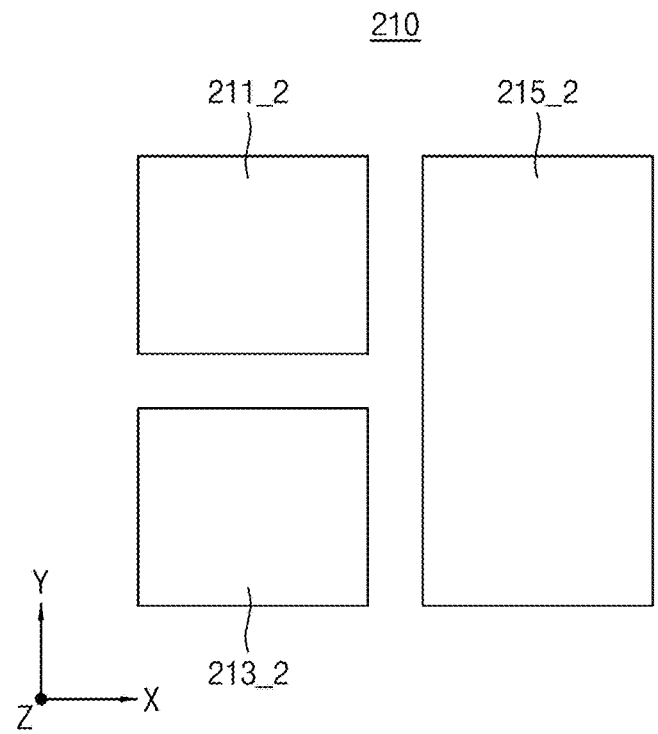
FIGS. 14 and 15 are plan views of lower structures each included in a vibration isolation table according to example embodiments of the disclosure, respectively.
Figure 15:
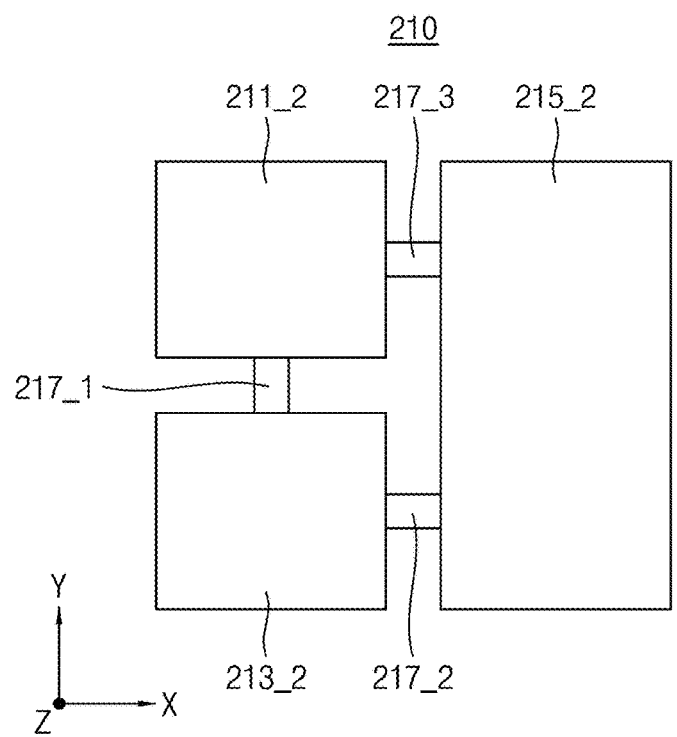

FIGS. 14 and 15 are plan views of lower structures each included in a vibration isolation table according to example embodiments of the disclosure, respectively.

Referring to FIG. 14, in an embodiment, a lower structure 210 may include block structures 211_2, 213_2 and 215_2 having different sizes. For example, the block structures 211_2, 213_2 and 215_2 may include a first block structure 211_2, a second block structure 213_2, and a third block structure 215_2, the first block structure 211_2 and the second block structure 213_2 may have the same size and the same shape, and the third block structure 215_2 may have a greater size than the first block structure 211_2 and the second block structure 213_2. The first block structure 211_2 and the second block structure 213_2 may be aligned with each other in a second direction (a Y direction), and the third block structure 215_2 may be disposed at one side of the first block structure 211_2 and the second block structure 213_2. The first block structure 211_2 and the second block structure 213_2 may be spaced apart from each other in the second direction (the Y direction), and the third block structure 215_2 may be spaced apart from each of the first block structure 211_2 and the second block structure 213_2 in a first direction (an X direction). The third block structure 215_2 may extend in the second direction (the Y direction) and, as such, may overlap or align with each of the first block structure 211_2 and the second block structure 213_2 in the first direction (the X direction).

The lower structure 210 including the first to third block structures 211_2, 213_2 and 215_2 may be disposed on the lattice beam 130 of FIG. 1, a middle structure 230 may be disposed on the lower structure 210, and an upper structure 250 may be disposed on the middle structure 230. The middle structure 230 and the upper structure 250 may vertically overlap or align with the first to third block structures 211_2, 213_2 and 215_2.

Referring to FIG. 15, a lower structure 210 may further include a plurality of reinforcements 217_1, 217_2 and 217_3, as compared to the lower structure 210 of FIG. 14. The reinforcements 217_1. 217_2 and 217_3 may include a first reinforcement 217_1 interconnecting the first block structure 211_2 and the second block structure 213_2, a second reinforcement 217_2 interconnecting the second block structure 213_2 and the third block structure 215_2, and a third reinforcement 217_3 interconnecting the third block structure 215_2 and the first block structure 211_2. In an embodiment, at least one of the second reinforcement 217_2 and the third reinforcement 217_3 may be omitted.

Figure 16:
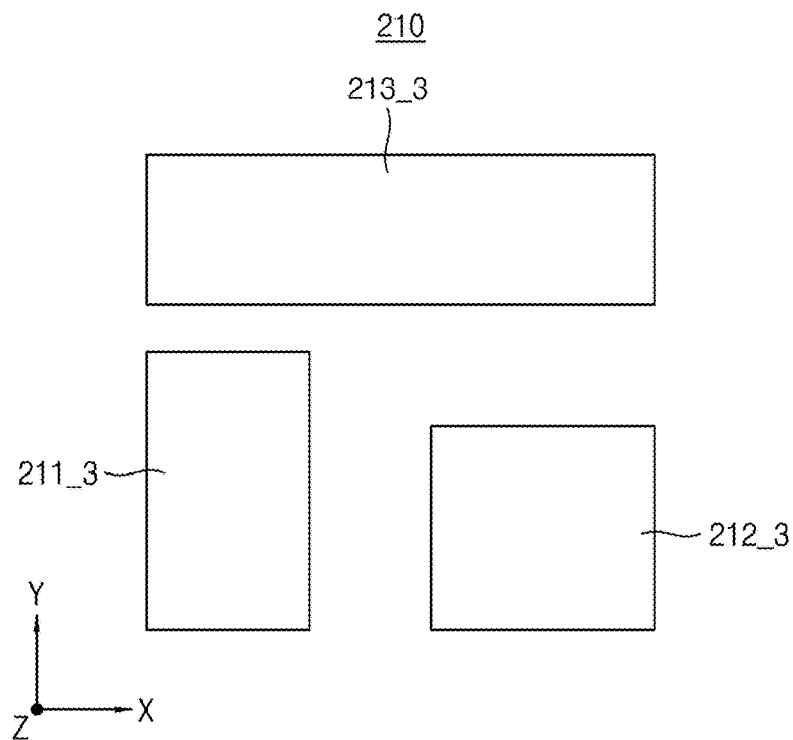
FIGS. 16 and 17 are plan views of lower structures each included in a vibration isolation table according to example embodiments of the disclosure, respectively.
Figure 17:
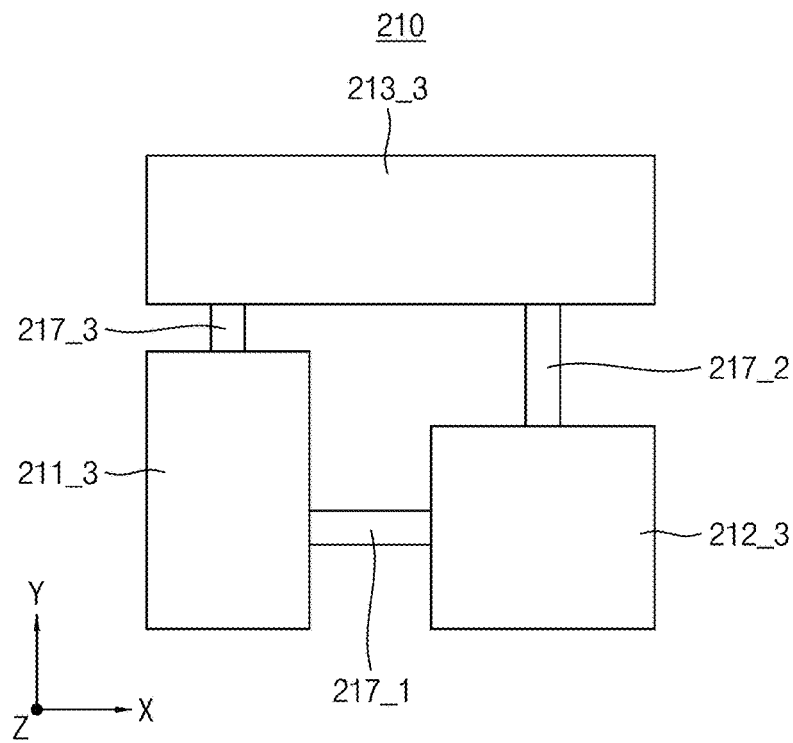

FIGS. 16 and 17 are plan views of lower structures each included in a vibration isolation table according to example embodiments of the disclosure, respectively.

Referring to FIG. 16, in an embodiment, a lower structure 210 may include block structures 211_3, 212_3 and 213_3 having different sizes. For example, the block structures 211_3, 212_3 and 213_3 may include a first block structure 211_3, a second block structure 212_3, and a third block structure 213_3, and the first block structure 211_3, the second block structure 212_3 and the third block structure 213_3 may each have different sizes and different shapes. The first block structure 211_3 and the second block structure 212_3 may be arranged in a first direction (an X direction). The third block structure 213_3 may be disposed at one side of the first block structure 211_3 and the second block structure 212_3. Each of the first block structure 211_3 and the second block structure 212_3 may overlap or align with the third block structure 213_3 in a second direction (a Y direction). The minimum distance between the first block structure 211_3 and the second block structure 212_3 may be different from the minimum distance between the second block structure 212_2 and the third block structure 213_3. The minimum distance between the first block structure 211_3 and the third block structure 213_3 may be different from the minimum distance between the second block structure 212_3 and the third block structure 213_3.

The lower structure 210 including the first to third block structures 211_3, 212_3 and 213_3 may be disposed on the lattice beam 130 of FIG. 1, a middle structure 230 may be disposed on the lower structure 210, and an upper structure 250 may be disposed on the middle structure 230. The middle structure 230 and the upper structure 250 may vertically overlap or align with the first to third block structures 211_3, 212_3 and 213_3.

Referring to FIG. 17, a lower structure 210 may further include a plurality of reinforcements 217_1, 217_2 and 217_3, as compared to the lower structure 210 of FIG. 16. The reinforcements 217_1. 217_2 and 217_3 may include a first reinforcement 217_1 interconnecting the first block structure 211_3 and the second block structure 212_3, a second reinforcement 217_2 interconnecting the second block structure 212_3 and the third block structure 213_3, and a third reinforcement 217_3 interconnecting the third block structure 213_3 and the first block structure 211_3. The lengths of the first reinforcement 217_1, the second reinforcement 217_2 and the third reinforcement 217_3 may be different. In an embodiment, at least one of the first reinforcement 217_1, the second reinforcement 217_2 and the third reinforcement 217_3 may be omitted.

Figure 18:
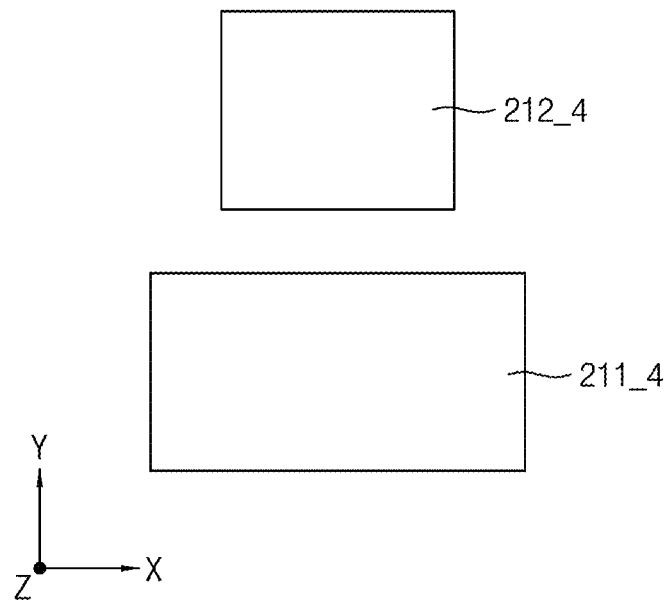
FIGS. 18 and 19 are plan views of lower structures each included in a vibration isolation table according to example embodiments of the disclosure, respectively.
Figure 19:
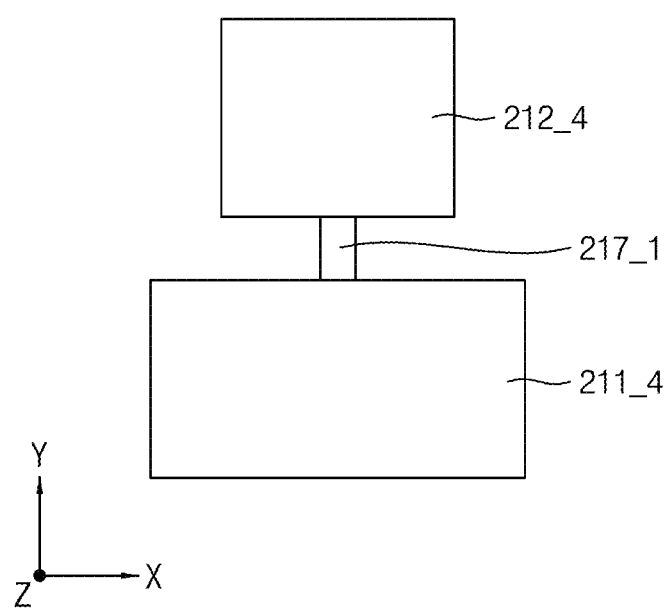

FIGS. 18 and 19 are plan views of lower structures each included in a vibration isolation table according to example embodiments of the disclosure, respectively.

Referring to FIG. 18, in an embodiment, a lower structure 210 may include a first block structure 211_4 and a second block structure 212_4. The first block structure 211_4 and the second block structure 212_4 may be arranged in a first direction (an X direction) or in a second direction (a Y direction). The lower structure 210 including the first and second block structures 211_4 and 212_4 may be disposed on the lattice beam 130 of FIG. 1, a middle structure 230 may be disposed on the lower structure 210, and an upper structure 250 may be disposed on the middle structure 230. The middle structure 230 and the upper structure 250 may vertically overlap or align with the first and second block structures 211_4 and 212_4.

Referring to FIG. 19, a lower structure 210 may further include a reinforcement 217_1 interconnecting the first block structure 211_4 and the second block structure 212_4, as compared to the lower structure 210 of FIG. 18.

Figure 20:
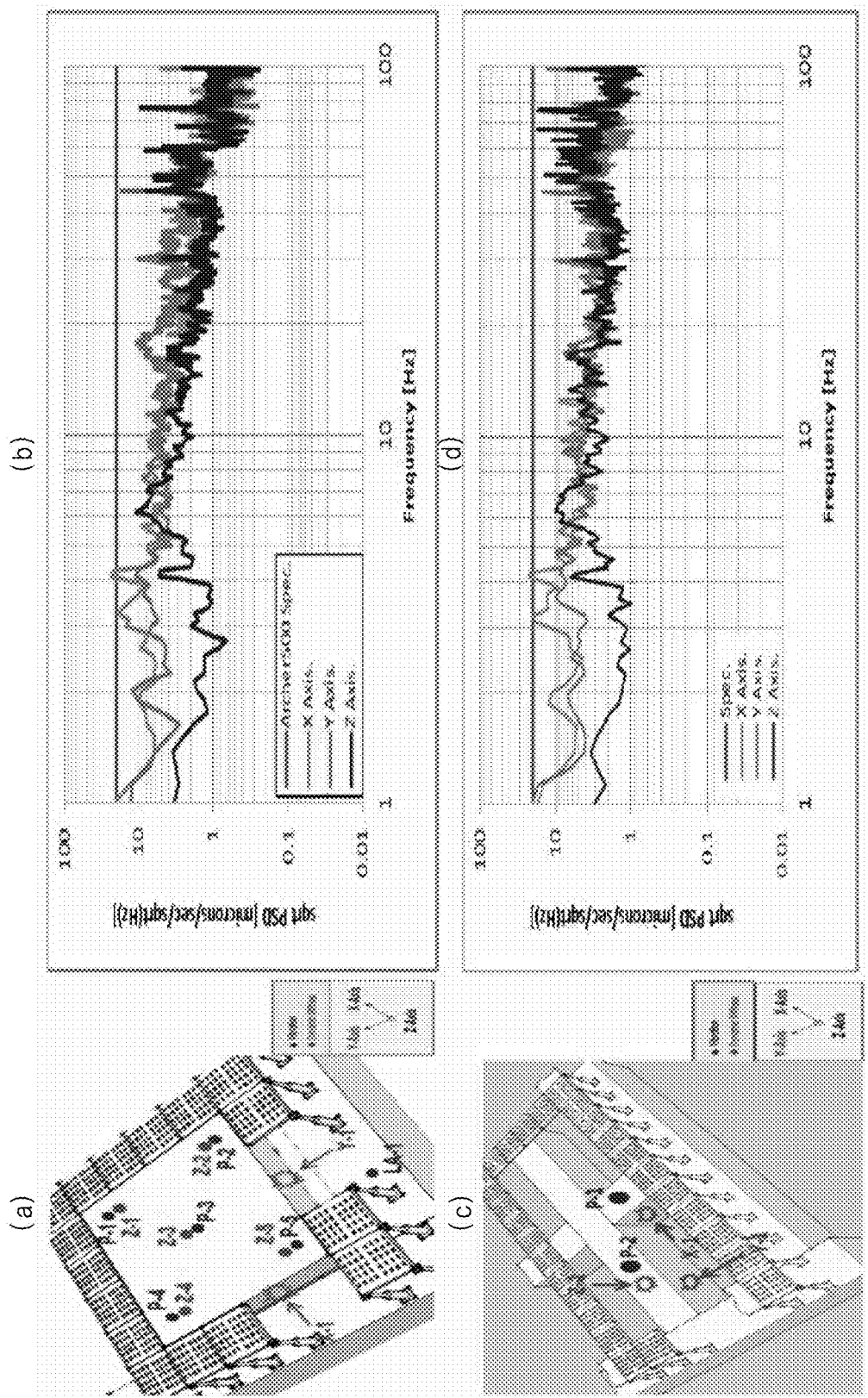
FIG. 20 includes graphs for comparing vibration attenuations of a vibration isolation table and a lattice beam in accordance with an example embodiment of the disclosure.

FIG. 20 includes graphs for comparing vibration attenuations of a vibration isolation table and a lattice beam in accordance with an example embodiment of the disclosure.

FIG. 20(a) is a view indicating positions X-1, Y-1 and Z-1 at which power spectral density (PSD) is measured in a vibration isolation table according to an example embodiment of the disclosure in order to check vibration attenuation of the vibration isolation table. FIG. 20(b) is a graph depicting power spectral densities (PSDs) measured at the positions X-1, Y-1 and Z-1 of FIG. 20(a).

FIG. 20(c) is a view indicating positions X-1, Y-1 and Z-1 at which power spectral density (PSD) is measured in a lattice beam in order to check vibration attenuation of the lattice beam. FIG. 20(d) is a graph depicting power spectral densities (PSDs) measured at the positions X-1, Y-1 and Z-1 of FIG. 20(c).

When FIGS. 20(b) and 20(d) are compared with each other, it can be seen that the vibration attenuation of the vibration isolation table and the vibration attenuation of the lattice beam have about the same level. Referring to FIG. 20, it can be seen that, when the vibration isolation table according to the example embodiment of the disclosure is used, the vibration attenuation level of the vibration isolation table may be enhanced compared to the vibration attenuation level of the lattice beam.

In accordance with the example embodiments of the disclosure, it may be possible to provide a vibration isolation table and a vibration isolation table system which are capable of obtaining a vibration attenuation effect having the same or improved vibration attenuation level as a lattice beam while being installed on the lattice beam in a state of bypassing an interfering object.

While the embodiments of the disclosure have been described with reference to the accompanying drawings, it should be understood by those skilled in the art that various modifications may be made without departing from the scope of the disclosure and without changing essential features thereof. Therefore, the above-described embodiments should be considered in a descriptive sense only and not for purposes of limitation.

What is claimed is:

1. A vibration isolation table for semiconductor equipment, the vibration isolation table comprising:
 a lower structure comprising a plurality of block structures that are elongated in a first direction;
 a middle structure on the lower structure; and
 an upper structure on the middle structure,
 wherein the plurality of block structures are spaced apart from one another in a second direction perpendicular to the first direction such that a space is formed between adjacent ones of the plurality of block structures,
 wherein at least one of the lower structure and the upper structure comprises high attenuation concrete,
 wherein the high attenuation concrete comprises a polymer and concrete,
 wherein the high attenuation concrete has a higher vibration attenuation than the concrete, and
 wherein the lower structure has a length in the first direction greater than a length of the upper structure in the first direction.

2. The vibration isolation table according to claim 1, wherein at least one of the plurality of block structures of the lower structure comprises:
 an inner filling portion comprising the high attenuation concrete; and an outer frame portion surrounding the inner filling portion.

3. The vibration isolation table according to claim 2, further comprising:
a plurality of reinforcements interconnecting the plurality of block structures.

4. The vibration isolation table according to claim 3, wherein each of the plurality of reinforcements is connected to the outer frame portion.

5. The vibration isolation table according to claim 3, wherein each of the plurality of reinforcements extends through the outer frame portion and into the inner filling portion.

6. The vibration isolation table according to claim 1, wherein the upper structure comprises:
an inner filling portion comprising the high attenuation concrete; and
an outer frame portion surrounding the inner filling portion.

7. The vibration isolation table according to claim 1, wherein the middle structure is a single H-beam comprising an iron-based material.

8. The vibration isolation table according to claim 1, wherein the middle structure comprises a plurality of H-beams.

9. The vibration isolation table according to claim 8, wherein the plurality of H-beams are spaced apart from one another.

10. The vibration isolation table according to claim 9, wherein the upper structure is vertically aligned with all of the plurality of block structures and the plurality of H-beams.

11. The vibration isolation table according to claim 1, further comprising:
an adhesive material between the middle structure and the upper structure.

12. The vibration isolation table according to claim 11, wherein the adhesive material comprises epoxy.

13. A vibration isolation table system for semiconductor equipment, the vibration isolation table system comprising:
an independent foundation structure comprising a floor support and a lattice beam;
a vibration isolation table on the independent foundation structure; and
a support structure disposed around the vibration isolation table on the independent foundation structure,
wherein the vibration isolation table comprises
a lower structure comprising a plurality of block structures,
an H-beam on the lower structure, and
an upper structure on the H-beam,
wherein the plurality of block structures extend and are elongated in a first direction, and are spaced apart from one another in a second direction perpendicular to the first direction such that a space is formed between adjacent ones of the plurality of block structures,
wherein the H-beam is vertically aligned with each of the plurality of block structures and is elongated in the second direction such that the H-beam extends over each of the plurality of block structures,
wherein at least one of the lower structure and the upper structure comprises high attenuation concrete comprising a polymer and concrete,
wherein the high attenuation concrete has a higher vibration attenuation than the concrete, and wherein the lower structure has a length in the first direction greater than a length of the H-beam in the first direction.

14. The vibration isolation table system according to claim 13, wherein:
the plurality of block structures comprise a first block structure and a second block structure which extend and are elongated in the first direction, and the first block structure and the second block structure are spaced apart from each other in the second direction perpendicular to the first direction; and
the H-beam is vertically aligned with each of the first block structure and the second block structure and is elongated in the second direction.

15. The vibration isolation table system according to claim 13, wherein each of the plurality of block structures comprises:
an inner filling portion comprising the high attenuation concrete; and
an outer frame portion surrounding the inner filling portion.

16. The vibration isolation table system according to claim 13, wherein the upper structure is vertically aligned with the lower structure and the H-beam, and has a parallelepiped shape.

17. The vibration isolation table system according to claim 13, further comprising:
a plurality of reinforcements interconnecting the plurality of block structures.

18. The vibration isolation table system according to claim 13, wherein:
the lower structure further comprises a protrusion extending from a side surface of the lower structure, the protrusion comprising a hole; and
the lower structure is coupled to the lattice beam or the H-beam via the protrusion and a fastener extending through the hole.

19. A vibration isolation table for semiconductor equipment, the vibration isolation table comprising:
a lower structure comprising a first block, a second block and a third block, each of which is elongated in a first direction and has a bar shape, the first to third blocks being spaced apart from one another in a second direction perpendicular to the first direction such that a space is formed between adjacent ones the first to third blocks;
an H-beam on the lower structure, the H-beam vertically overlapping only a portion of each of the first to third blocks while being elongated in the second direction; and
an upper structure on the H-beam, the upper structure vertically overlapping at least a portion of each of the first to third blocks and at least a portion of the H-beam and having a parallelepiped shape,
wherein at least one of the lower structure and the upper structure comprises high attenuation concrete comprising a polymer and concrete, and
wherein the high attenuation concrete has a higher vibration attenuation than the concrete.

* * * * *